(12) United States Patent
Li et al.

(10) Patent No.: US 12,581,427 B2
(45) Date of Patent: Mar. 17, 2026

(54) SYSTEMS AND METHODS OF POWER STATE AWARE DYNAMIC SPECIFIC ABSORPTION RATE MANAGEMENT

(71) Applicant: Meta Platforms Technologies, LLC, Menlo Park, CA (US)

(72) Inventors: Ding Li, Fremont, CA (US); Siddharth Ray, Cupertino, CA (US); Songping Wu, Palo Alto, CA (US); Jin Yang, Fremont, CA (US); Wei Sun, Redmond, WA (US); Peter Eli Renner, San Jose, CA (US); Shu Zhang, Los Gatos, CA (US); Nan Wang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 399 days.

(21) Appl. No.: 18/095,749

(22) Filed: Jan. 11, 2023

(65) Prior Publication Data

US 2024/0236869 A1      Jul. 11, 2024

(51) Int. Cl.
*H04W 52/28* (2009.01)
*H04W 52/36* (2009.01)

(52) U.S. Cl.
CPC ....... *H04W 52/283* (2013.01); *H04W 52/367* (2013.01)

(58) Field of Classification Search
CPC ......... H04W 52/00–60; H04W 52/283; H04W 52/367
See application file for complete search history.

(56) References Cited

U.S. PATENT DOCUMENTS

| | | | |
|---|---|---|---|
| 11,368,573 B1 * | 6/2022 | Teng | G06F 3/017 |
| 2014/0002375 A1 * | 1/2014 | Rydenhag | G06F 3/04883 |
| | | | 345/173 |
| 2014/0187281 A1 * | 7/2014 | Faraone | H04W 52/146 |
| | | | 455/522 |
| 2014/0267034 A1 * | 9/2014 | Krulce | G06F 21/32 |
| | | | 345/158 |
| 2019/0235255 A1 * | 8/2019 | Seibert | G06F 3/011 |
| 2020/0285069 A1 * | 9/2020 | Villalpando | G02C 11/10 |
| 2021/0049360 A1 * | 2/2021 | Yildiz | G02B 27/017 |

* cited by examiner

*Primary Examiner* — Raymond S Dean
(74) *Attorney, Agent, or Firm* — Morgan, Lewis & Bockius LLP

(57) ABSTRACT

Disclosed herein are related to a device. The device can include a wireless communication interface and one or more processors. The wireless communication interface can transmit data to a remote device. The one or more processors can determine a particular control state from a plurality of control states according to sensor data received from a plurality of sensors. The control states can be for meeting at least one of a specific absorption rate (SAR) or power density (PD) for operation of the wireless communication interface. The one or more processors can control operation of the at least one wireless communication interface according to the particular control state.

20 Claims, 8 Drawing Sheets

150

100

400

150

700

Receive sensor data from sensors
710

Select control state from plurality of control states
720

Control wireless communication interface according to
control state 730

SYSTEMS AND METHODS OF POWER STATE AWARE DYNAMIC SPECIFIC ABSORPTION RATE MANAGEMENT

FIELD OF DISCLOSURE

The present disclosure is generally related to control of wireless communication interfaces, including but not limited to control according to quality of service and/or energy absorption.

BACKGROUND

Developments in computing devices and communication devices have prompted growth in wearable technology. Wearable devices may integrate various components in a compact form, such that the wearable devices can be portable yet perform complex processes. For example, a wearable device may be a smart watch that may access content over the network, and may control or communicate with other computing devices, etc. For example, a wearable device may be a head mounted display (HMD) that may present artificial reality (e.g., virtual reality, augmented reality, mixed reality, etc.).

SUMMARY

Various implementations disclosed herein are related to a device. The device can include a wireless communication interface and one or more processors. The wireless communication interface can transmit data to a remote device. The one or more processors can determine a particular control state from a plurality of control states according to sensor data received from a plurality of sensors. The one or more processors can control operation of the at least one wireless communication interface according to the particular control state.

In some implementations, the device includes the plurality of sensors. The plurality of sensors can include an inertial measurement unit (IMU). The plurality of sensors can include a Hall sensor to detect whether an arm of the device coupled with a display member of the device is in a first position or a second position. The plurality of sensors can include a sensor to detect whether the device is being worn. The plurality of sensors can include a sensor to indicate whether the device is coupled with a charger or in a charging case.

In some implementations, the plurality of control states include at least one state indicative of the device being in an on-body state and at least one state indicative of the device being in an off-body state. In some implementations, the one or more processors are configured to control the operation of the at least one wireless communication interface by controlling at least one of a transmission power or a duty cycle of wireless data transmission by the at least one wireless communication interface.

In some implementations, at least one first sensor of the plurality of sensors is disabled according to a power state of a power supply of the device, and the one or more processors are configured to determine the particular control state according to sensor data from at least one second sensor of the plurality of sensors and not from the at least one first sensor.

In some implementations, the one or more processors are configured to reduce at least one of a transmission power or a duty cycle of transmission by the at least one wireless communication interface responsive to the particular control state corresponding to the device being in an on-body state. In some implementations, the one or more processors are configured to control the operation of the at least one wireless communication interface according to (i) the particular control state and (ii) at least one of a specific absorption rate (SAR) or a power density (PD) for operation of the wireless communication interface.

Various implementations disclosed herein are related to a method. The method can include determining a particular control state from a plurality of control states according to sensor data received from a plurality of sensors. The method can include controlling operation of the at least one wireless communication interface according to the particular control state.

In some implementations, the device includes the plurality of sensors. The plurality of sensors can include an inertial measurement unit (IU). The plurality of sensors can include a Hall sensor to detect whether an arm of the device coupled with a display member of the device is in a first position or a second position. The plurality of sensors can include a sensor to detect whether the device is being worn. The plurality of sensors can include a sensor to indicate whether the device is coupled with a charger or in a charging case.

In some implementations, the plurality of control states include at least one state indicative of the device being in an on-body state and at least one state indicative of the device being in an off-body state. In some implementations, the method includes controlling the operation of the at least one wireless communication interface by controlling at least one of a transmission power or a duty cycle of wireless data transmission by the at least one wireless communication interface.

In some implementations, at least one first sensor of the plurality of sensors is disabled according to a power state of a power supply of the device, and the method includes determining the particular control state according to sensor data from at least one second sensor of the plurality of sensors and not from the at least one first sensor.

In some implementations, the method includes reducing at least one of a transmission power or a duty cycle of transmission by the at least one wireless communication interface responsive to the particular control state corresponding to the device being in an on-body state. In some implementations, the method includes controlling the operation of the at least one wireless communication interface according to (i) the particular control state and (ii) at least one of a specific absorption rate (SAR) or a power density (PD) for operation of the wireless communication interface.

Various implementations disclosed herein are related to a non-transitory computer readable medium that includes computer-executable instructions. The instructions can cause one or more processors to determine a particular control state from a plurality of control states according to sensor data received from a plurality of sensors. The instructions can cause the one or more processors to control operation of the at least one wireless communication interface according to the particular control state.

The plurality of sensors can include an inertial measurement unit (IMU). The plurality of sensors can include a Hall sensor to detect whether an arm of the device coupled with a display member of the device is in a first position or a second position. The plurality of sensors can include a sensor to detect whether the device is being worn. The plurality of sensors can include a sensor to indicate whether the device is coupled with a charger or in a charging case.

In some implementations, the plurality of control states include at least one state indicative of the device being in an on-body state and at least one state indicative of the device being in an off-body state. In some implementations, the instructions cause the one or more processors to control the operation of the at least one wireless communication interface by controlling at least one of a transmission power or a duty cycle of wireless data transmission by the at least one wireless communication interface.

In some implementations, at least one first sensor of the plurality of sensors is disabled according to a power state of a power supply of the device, and the instructions can cause the one or more processors to determine the particular control state according to sensor data from at least one second sensor of the plurality of sensors and not from the at least one first sensor.

In some implementations, the instructions cause the one or more processors to reduce at least one of a transmission power or a duty cycle of transmission by the at least one wireless communication interface responsive to the particular control state corresponding to the device being in an on-body state. In some implementations, the instructions cause the one or more processors to control the operation of the at least one wireless communication interface according to (i) the particular control state and (ii) at least one of a specific absorption rate (SAR) or a power density (PD) for operation of the wireless communication interface.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
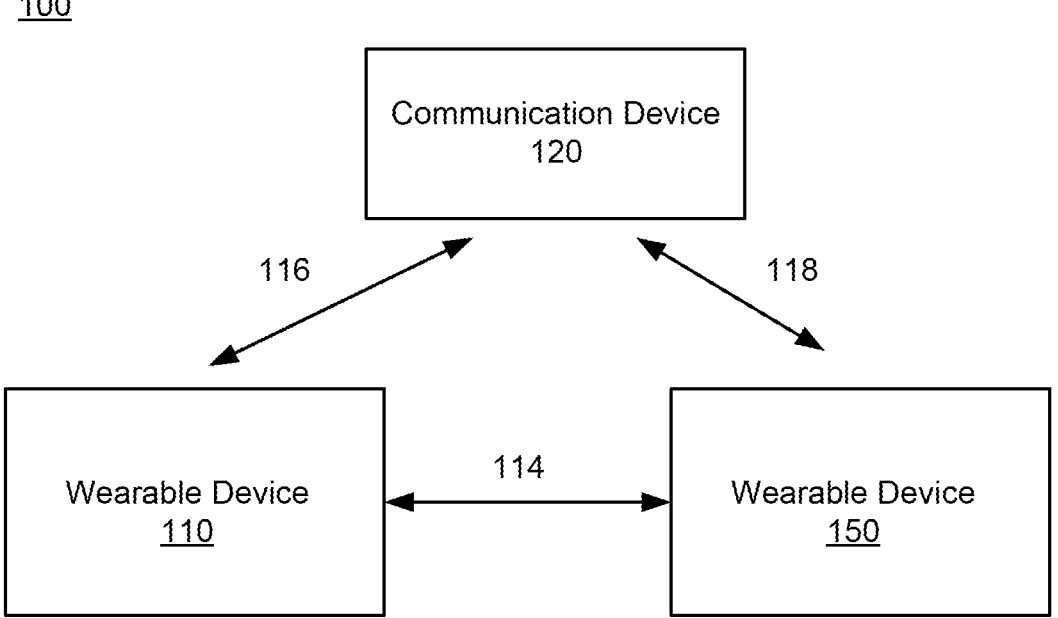
FIG. 1 is a diagram of a system environment including wearable devices, according to an example implementation of the present disclosure.

Before turning to the figures, which illustrate certain implementations in detail, it should be understood that the present disclosure is not limited to the details or methodology set forth in the description or illustrated in the figures.

It should also be understood that the terminology used herein is for the purpose of description only and should not be regarded as limiting.

Disclosed herein are implementations related to systems and methods of power state aware dynamic specific absorption rate (SAR) management. For example, RF signal generation associated with wearable device (e.g., smart glasses) operation can be dynamically managed, rather than applying a single predetermined power level for SAR management. The SAR management can be performed according to factors such as SAR and/or power density (PD) criteria; device state (e.g., on head, in hand, on chest, off body); wireless performance considerations; and power usage (e.g., battery usage) considerations.

This can be particularly significant for HMD or wearable device use cases, where battery capacity is fairly limited. For example, some devices, including HMDs, operate in multiple states corresponding to varying levels of power usage and/or component activation, such as normal, sleep, and deep sleep states, according to factors such as battery capacity and/or available power. In some implementations, one or more sensors may be disabled or may operate in a lower power mode responsive to the device operating in the sleep or deep sleep states. For example, a device can have a first (e.g., normal) power mode, in which all sensors are awake (e.g., operate normally), and wireless transmission is permitted; a second (e.g., sleep) lower power mode, in which a subset of the sensors are awake, and may be in a lower power mode (e.g., where a hinge of the device is closed, a Don/Doff (e.g., device being on body, or device being off body) sensor may be disabled (since it may be expected that the device is not being worn on the head while the hinge is closed) or where hinge is opened, the Don/Doff sensor may be enabled), including an inertial measurement unit (IMU) being in a low power mode; and a third (e.g., deep sleep) lowest power mode, in which only a subset of sensors may be awake, and wireless transmission may not be permitted. Transitions between the power modes may be determined according to timers; for example, the device may transition from the first power mode to the second power mode responsive to the hinge being closed for a threshold duration (e.g., 30 seconds) or the Don/Doff sensor indicating a Doff state for a threshold duration (e.g., 30 seconds); the device may transition from the second power mode to the third power mode responsive to the IMU indicating a static state (e.g., no motion) for a threshold duration (e.g., twenty minutes).

Devices that implement wireless communications may be subject to criteria such as SAR exposure limits (e.g., for signals below 6 GHz) and/or PD exposure limits (e.g., for signals above 6 GHz). Devices such as HMDs, such as smart glasses, may be used in various use cases that may have varying SAR/PD considerations, such that applying a single, predetermined reduction in transmit power (or other operational parameters of wireless communication interfaces) may result in excess power reduction, latency/jitter, or other power usage or performance-related considerations. For example, distinct use cases (and related SAR/PD considerations) may include the on body use cases such as the HMD being worn on the face, on the head but tilted up, on the chest (e.g., hanging from shirt with at least one hinge closed), in the hands, or off body use cases.

Systems and methods in accordance with the present disclosure can more precisely determine use cases or device states relating to how the HMD is being worn, and thus more precisely control operation of wireless communication interfaces, such as cellular, WiFi, and/or Bluetooth interfaces according to the determinations. The systems and methods can use sensor data from a plurality of sensors to determine a mitigation level according to the sensor data. For example, the system can use data from a Hall sensor coupled with a hinge of the device to determine whether the device is in a folded state or unfolded state. The system can use data from a proximity sensor coupled with an arm of the device to determine whether the device is being worn on the head of the user. The system can use motion data from a motion sensor, such as an inertial measurement unit (IMU), which can further indicate whether the device is being worn (e.g., data indicative of movement indicates it is likely the device is worn/held by the user).

The system can use at least one determination of the device's state to identify the mitigation level (e.g., particular control state) to use. The identified mitigation level can be used to generate instructions to control operation of wireless communication interfaces according to the mitigation level to ensure that SAR/PD criteria are met while optimizing performance and/or minimizing power usage. The system can map the determinations to particular mitigation indices/ approaches to identify the mitigation level to use. This can enable the system to more effectively manage SAR/PD criteria while also meeting performance targets in the power-sensitive use cases associated with HMD operation.

FIG. 1 depicts a block diagram of an example system 100. In some implementations, the system 100 includes a communication device 120, a wearable device 110, and a wearable device 150. The wearable device 110 may be a smart watch, and the wearable device 150 may be a head wearable device (HWD) 150. The communication device 120 may be an access point or any other communication device. The HWD 150 may be referred to as, include, or be part of a head mounted display (HMD), head mounted device (HMD), head worn display (HWD) or head worn device (HWD). The wearable device 110 and the HWD 150 may communicate with each other through a communication link 114. The wearable device 110 and the communication device 120 may communicate with each other through a communication link 116, and the wearable device 150 and the communication device 120 may communicate with each other through a communication link 118. Through the wireless links 116, 118, the wearable devices 110, 150 may access content (e.g., text, image, audio, video, etc.) from other devices. The communication links 114, 116, 118 may be wireless links (e.g., cellular link, Wi-Fi link, Bluetooth link, 60 GHz link, ultra wideband link, etc.). The communication links 114, 116, 118 may each have an associated Quality of Service (QoS) and/or radio resource information. The communication links 114, 116, 118 may at least be based on the same protocol or different protocols. For example, the communication links 116, 118 may conform to the 3G, 4G, 5G, LTE, 60 GHz protocol, where the communication link 114 may conform to the Wi-Fi link, Bluetooth, etc. In some implementations, the system 100 includes more, fewer, or different components than shown in FIG. 1.

In one aspect, the wearable device 110 and the wearable device 150 may operate together to provide/support artificial reality for a user. In one example, the wearable device 150 may detect a location and an orientation of the wearable device 150, and generate a sensor measurement indicating the detected location and orientation of the wearable device 150. The wearable device 150 may transmit the sensor measurement to the wearable device 110 through the communication link 114. The wearable device 110 may receive the sensor measurement, and may generate or determine a view of the artificial reality corresponding to the detected location and orientation of the wearable device 150. The wearable device 110 may generate image data of the determined view of the artificial reality, and transmit the image data to the wearable device 150 through the communication link 114. The HWD 150 may receive the image data, and can present an image of the artificial reality to a user according to the image data. In one aspect, the process of detecting the location and the orientation of the HWD 150, and rendering the image to the user should be performed within a frame time (e.g., 11 ms or 16 ms). Any latency between a movement of the user wearing the HWD and an image displayed corresponding to the user movement can cause judder, which may result in motion sickness and can degrade the user experience.

The wearable devices 110, 115 may dynamically adjust or control the communication link 114, the communication link 116, the communication link 118 or any combination of them according to inputs from a plurality of sensors. For example, data from the sensors can be used to detect that the device 110 or 150 is on the user and determine the state to reflect an on-body configuration. Data from the sensors can be used to determine that the device 110 or 150 is off of the user, and update the state to reflect an off-body configuration. The state change from the on-body state to the off-body state can be performed responsive to a delay set by a timer, which can allow the device 110 or 150 to avoid triggering changes to the off-body state responsive to transient changes in device positioning. The device 110 or 150 can provide a signal at least based on the state to control the wireless communication link 118.

Figure 2:
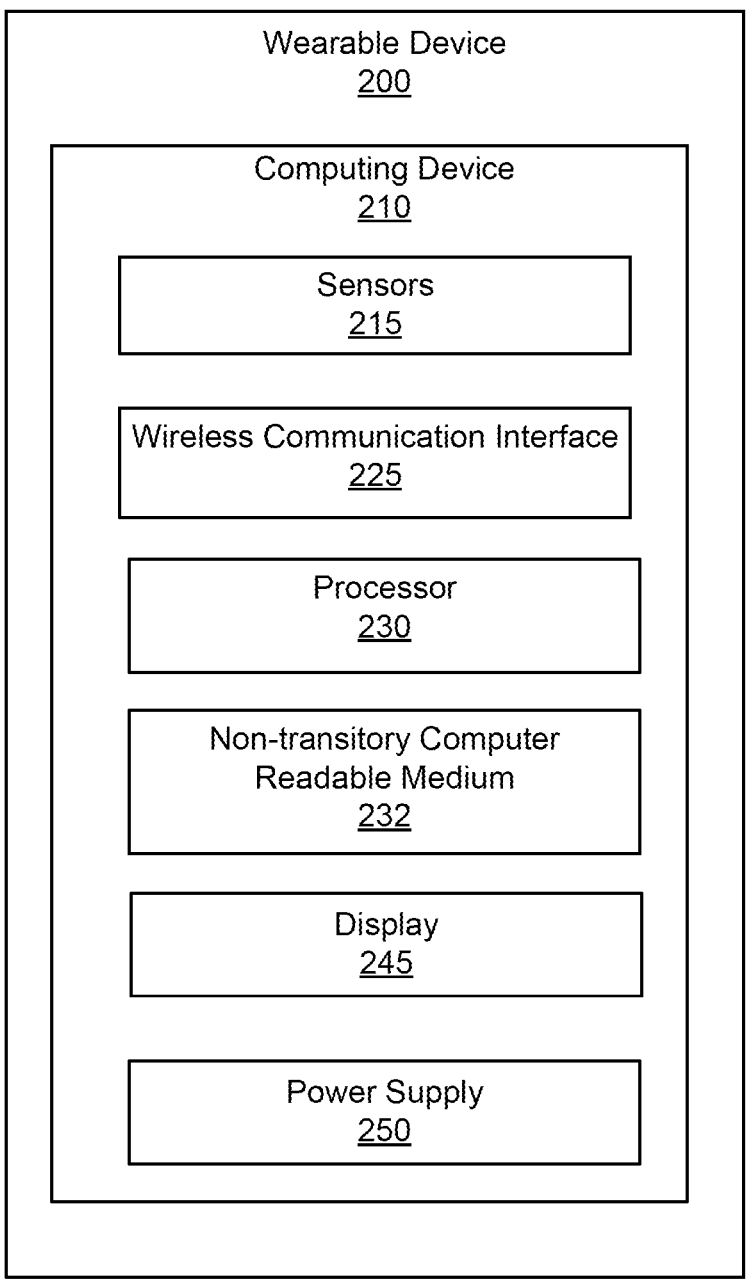
FIG. 2 is a diagram of a wearable device, according to an example implementation of the present disclosure.

FIG. 2 is a diagram of a wearable device 200, according to an example implementation of the present disclosure. In some implementations, the wearable device 200 may be the wearable device 110 or the wearable device 150. In some implementations, the wearable device 200 includes sensors 215, wireless communication interface 225, processor 230, non-transitory computer readable medium 232, and a display 245. These components may operate together to communicate with another device, change parameters of the device 200, and generate or render content (e.g., AR content). In other implementations, the wearable device 20 includes more, fewer, or different components than shown in FIG. 2.

In some implementations, the sensors 215 include electronic components or a combination of electronic components and software components that detect a proximity of a user wearing the wearable device 200. For example, the sensors 215 can include a hall sensor that can detect whether the user is proximate (e.g., less than 10 mm) to the sensor or whether the user is contacting the wearable device 200. The sensors 215 may detect a proximity of the user with respect to the wearable device 200, and generate a sensor measurement data indicating the detected proximity.

In some implementations, the sensors 215 include electronic components or a combination of electronic components and software components that can operate to sense/ determine/measure a location and an orientation of the wearable device 200. Examples of the sensors 215 can include: one or more imaging sensors, one or more accelerometers, one or more capacitance sensors, one or more gyroscopes, one or more magnetometers, one or more capacitive sensors, or any other suitable type of sensor(s) that detects motion and/or location. For example, one or more accelerometers can measure translational movement (e.g., forward/back, up/down, left/right) and one or more gyroscopes can measure rotational movement (e.g., pitch, yaw, roll). In some implementations, the sensors 215 detect the translational movement and the rotational movement, and determine an orientation and location of the wearable device 200. The sensors 215 may generate sensor measurements indicating the detected location and orientation of the wearable device 200. The sensors 215 can measure a permittivity of a user or of the surrounding area. The sensors 215 can include an antenna for detection of proximity and/or location. The sensors 215 can include electrical components to transmit or receive a signal to measure a parameter indicative of proximity. The sensors 215 can communicate with a wireless communication interface 225, either directly or via other components discussed herein.

In some implementations, the wireless communication interface 225 includes an electronic component or a combination of an electronic component and a software component that communicates with another device through a wireless communication link (e.g., communication link 114, 116, 118). In some implementations, the wireless communication interface 225 includes or is embodied as a transceiver or a communication modem coupled to the transceiver for transmitting and receiving data through a wireless medium. The wireless communication interface 225 may transmit or receive sensor measurement data indicating a location and an orientation of the wearable device 200. Moreover, the wireless communication interface 225 may transmit or receive image data indicating or corresponding to an image to be rendered. The wireless communication interface 225 can include one or more antennas, radios, transmitters, receivers, or various combinations thereof to facilitate generating, wirelessly transmitting, and wirelessly receiving data, such as to facilitate wireless communications between devices 110, 120, 150 described with reference to FIG. 1. As described further herein, the wireless communication interface 225 can include or be coupled with cellular interface 330 and WiFi interface 340.

In some implementations, the processor 230 includes an electronic component or a combination of an electronic component that can execute instructions stored by the non-transitory computer readable medium 232. The processor 230 may include one or more central processing units (CPUs), graphical processing units (GPUs) or a combination of them. The non-transitory computer readable medium 232 may store instructions for executing one or more applications executable by the processor 230.

One example application when executed by the processor 230 may cause the processor 230 to generate or process content for rendering. The processor 230 executing the application may cause the processor 230 to generate image data for rendering, according to sensor measurement data from the sensors 215 or the wireless communication interface 225. For example, the processor 230 executing the application may determine a view of the AR corresponding to detected location and orientation in the sensor measurement data and generate image data of the determined view of the AR.

Example applications when executed by the processor 230 may cause the processor 230 to control or adjust the wireless communication interface 225. Example applications include SAR manager 300 described with reference to FIG. 3. These applications may be executed by the processor 230 to adaptively or dynamically control/manage the wireless communication interface(s) 225, according to a determined state of the device. The SAR manager 300 may configure or operate the wireless communication interface(s) 225 according to the determined device state.

In some implementations, the display 245 is an electronic component that displays an image. The display 245 may, for example, be a liquid crystal display or an organic light emitting diode display. The display 245 may be a transparent display that allows the user to see through.

The wearable device 200 can include at least one power supply 250. The power supply 250 can be a battery, such as a lithium ion battery. The power supply 250 can have a size and can have a corresponding capacity to enable the wearable device 200 to have a relatively small form factor.

Referring further to FIG. 2, the wearable device 200 can be coupled with a charger 275. The charger 275 can connect the power supply 250 directly or indirectly to a power source (e.g., a second power supply; mains power via a wall outlet connection) to enable the power supply 250 to be charged. The charger 275 can have a form factor of a charging case, such as a housing that can open to receive the wearable device 200. The sensors 215 can include at least one sensor to output an indication that the wearable device 200 is coupled with the charger 275, such as a contact/connection sensor 215 that outputs the indication responsive to at least one of mechanical contact or electrical contact or electromagnetic/wireless connection between the charger 275 and the wearable device 200.

Figure 3:
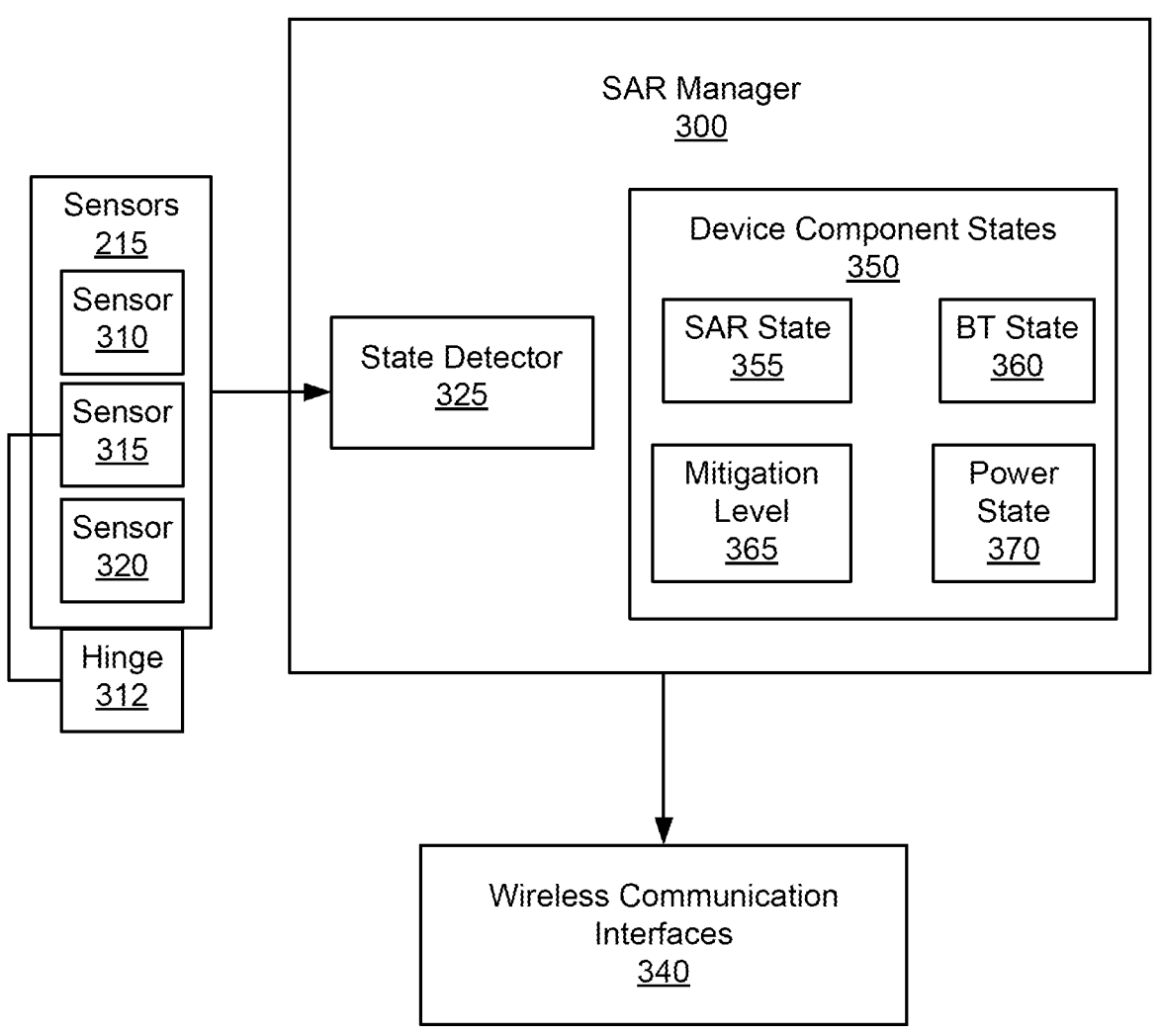
FIG. 3 is a block diagram of a specific absorption rate manager, according to an example implementation of the present disclosure.

FIG. 3 is a block diagram of an SAR manager 300. The SAR manager 300 can be implemented by one or more devices or components thereof as described with reference to FIGS. 1 and 2. For example, the SAR manager 300 can be implemented by the processor 230 and non-transitory computer readable medium 232 described with reference to FIG. 2. The SAR manager 300 can be or include any function, operation, routine, logic, or instructions to perform functions such as detecting state information regarding the device 200 and controlling operation of wireless communications based at least on the state information. The SAR manager 300 can receive sensor inputs and can detect states, according to an example implementation. The SAR manager 300 can use the detected state to control operation of a wireless communication link, such as to control operation of wireless communication interface(s) 225.

The SAR manager 300 can include or be coupled with a plurality of sensors 215. The sensors can be different (e.g., different types of) sensors. The sensors 215 can include three or more distinct sensors, 310, 315, 320. The SAR manager 300 can receive sensor data from one or more sensors 215 (e.g., sensors 310, 315, 320), and can process the received sensor data to determine a state of the device operating the SAR manager 300 (e.g., device 110; device 150). The SAR manager 300 can periodically request the sensor data from the sensors 215 (such as to provide the sensor data to state detector 325). The sensors 215 can periodically transmit the sensor data to the SAR manager 300, or in response to receiving a request from the SAR manager 300. The sensors 215 can transmit the sensor data responsive to a value represented by the sensor data meeting a transmission condition (e.g., responsive to the value or a change in the value being greater than a threshold or a threshold change indicative of proximity to the user).

The sensors 215 can include at least one sensor 310. The sensor 310 can be a Hall effect sensor. The sensor 310 can be coupled with or adjacent to a hinge 312 of the device 200. The hinge 312 can be positioned between an arm and display (e.g., display 245) of the device 200, such as a temple arm of a glasses form factor. At least one sensor 215 can determine a position state of the hinge 312 (or the arm), such as whether the hinge 312 is open (which may be indicative of the device 200 being worn on the head/face) or closed (which may be indicative of the device 200 not being worn on the head/face). In some implementations, the sensor 310 outputs first sensor data indicating the hinge 312 is open, or second sensor data indicating the hinge 312 is closed.

The sensors 215 can include at least one sensor 315. The sensor 315 can be a sensor to indicate whether the device 200 is being worn on the head, such as a Don/Doff sensor. For example, the sensor 315 can include at least one of a capacitive sensor, a proximity sensor, a photoelectric sensor, or a light sensor configured to detect an indication of the device 200 being worn on the head (or any part of a body), such as by detecting an indication of proximity to human hair or tissue. In some implementations, the sensor 315 outputs first sensor data indicating that the device 200 is being worn on the head (e.g., "Don" state), or second sensor data indicating that the device 200 is not being worn on the head (e.g., "Doff" state).

The sensors 215 can include at least one sensor 320, which can be an inertial measurement unit (IMU). The sensor 320 can be used to detect movement and can output an indication of the movement (e.g., output movement data) that includes at least one of velocity, angular rate or velocity, force, or acceleration. The sensor 320 can include one or more of an accelerometer, a gyrometer, or a magnetometer. A combination of measurements can be collected to determine movement of the device. The SAR manager 300 can receive the movement data, and can determine the device 200 to be moving responsive to the movement data satisfying a movement criteria (e.g., threshold velocity, threshold acceleration), or can determine the device 200 to not be moving responsive to the movement data not satisfying the movement criteria. The SAR manager 300 can determine that the device 200 is in an on-body state responsive to determining that the movement data satisfies the movement criteria, since it may be unlikely for the device 200 to be moving while not being worn.

The SAR manager 300 can include a state detector 325. The state detector 325 can be or include any function, operation, routine, logic, or instructions to perform functions such as detecting a state of the device 200 according to sensor data received from one or more of the sensors 215. For example, the state detector 325 can detect a control state, which may correspond to a mitigation level for mitigating power usage, for controlling operation of wireless communication interfaces 340. The state detector 325 can detect precise control states corresponding to specific use cases (e.g., several different situations in which the device 200 may be sufficiently close to the body of the user, in which different amounts of mitigation may be useful). The state detector 325 can enable the SAR manager 300 to control operation of wireless communication interfaces 340 in various manners according to the detected control state.

The state detector 325 can periodically sample (e.g., transmit a request for data from) the sensor data from one or more of the sensors 310, 315, 320, and can update the state responsive to sampling the sensor data. In some implementations, the state detector 325 updates the particular control state responsive to a transition of power modes of the device 200 (e.g., from normal power to low power or vice versa; from low power to deep sleep or vice versa). The state detector 325 can sample the sensor data from one or more of the sensors 310, 315, 320 at a same rate or at different rates. As described further herein, the state detector 325 can provide a signal to the wireless communication interfaces 340 (e.g., to at least one cellular interface or WiFi interface) according to the control state, and can update the signal responsive to updating the control state, such as to update a particular transmission power for use by the wireless communication interface 340 responsive to the updated state.

The state detector 325 can detect a particular control state (e.g., sometimes referred to as device state or device state index) of a plurality of control states of the device 200. The plurality of control states of the device 200 can correspond to at least one of proximity of the device 200 relative to a particular portion of the body of the user or a form factor in which the device 200 is arranged. For example, the control states can be indicative of the device 200 being in on-body states, such as on the head, on the face (e.g., in front of the eyes), in the hand, on the shirt, or in the pocket. The control states can be indicative of the device 200 being in off-body states, such as in the charger 275, or on a surface (e.g., table).

The state detector 325 can detect the particular control state according to sensor data from at least one of the sensor 310, the sensor 315, or the sensor 320. As noted above, in some instances, one or more sensors 310, 315, 320 may operate in a low power state or disabled state (e.g., based on the device 200 controlling operation of its components according to a state of the power supply 250), in which case the state detector 325 may not receive sensor data from one or more sensors 310, 315, 320, or may receive the sensor data at a reduced rate. For example, while the device 200 is in low power mode and the hinge 312 is closed, the sensor 315 may be disabled and the sensor 320 may be in lower power mode, and the state detector 325 can determine the particular control state according to sensor data from the sensor 310 and the sensor 320 (and may use sensor data indicative of whether the device 200 is in the charger 275) but not the sensor 315; while the device 200 is in low power mode and the hinge 312 is open, the sensor 315 may be enabled and the sensor 320 may be in low power mode, and the state detector 325 can determine the particular control state according to sensor data from the sensor 310, the sensor 315, and the sensor 320 (and may use sensor data indicative of whether the device 200 is in the charger 275); while the device 200 is in the deep sleep mode, the state detector 325 may use sensor data from a limited subset of sensors 215, and may determine the control state to be a no transmission state until receiving an indication that the device 200 has transitioned to the normal power mode or low power mode.

Figure 4:
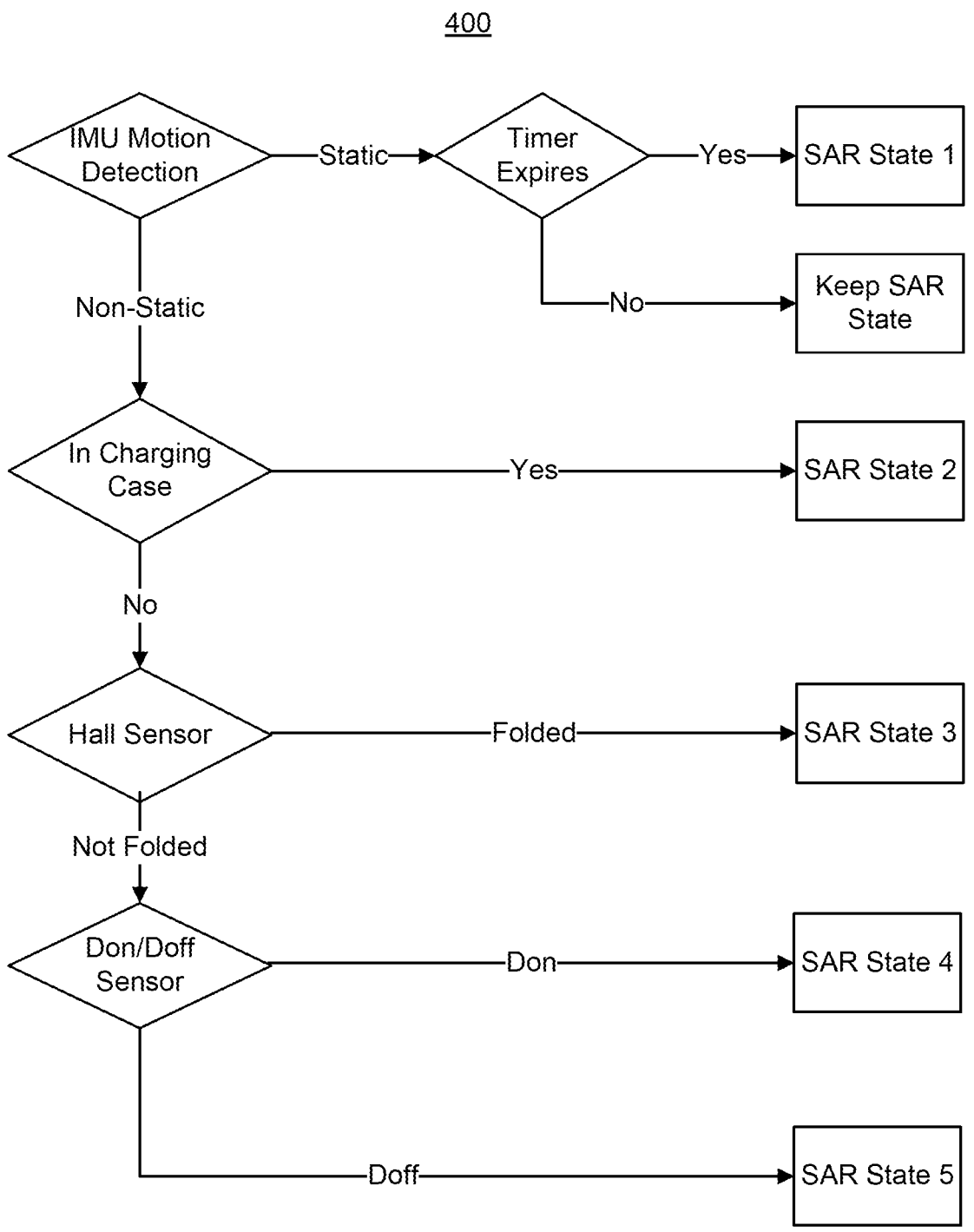
FIG. 4 is a flowchart of a state detection process, according to an example implementation of the present disclosure.

As described further herein with reference to the example implementation of FIG. 4, the state detector 325 can determine the particular control state by evaluating the sensor data in an order. For example, the state detector 325 can first evaluate sensor data from the IMU sensor 320, second evaluate sensor data indicating whether the device 200 is coupled with the charger 275, third evaluate sensor data from the hall sensor 310, and fourth evaluate sensor data from the Don/Doff sensor 315. Various other orders may be used and/or modified according to whether particular sensors 215 are available, active, in low power mode, or disabled. The ordering of sensor data evaluation can enable the SAR manager 300 to more efficiently detect control states even where certain sensor data may not be available or may not be available as frequently due to the power mode of the device 200.

Referring further to FIGS. 2 and 3, the wearable device 200 can include at least one wireless communication interface 340. The wireless communication interfaces 340 can include various wireless communications devices, including cellular, WiFi, and/or Bluetooth devices. At least some aspects of the wireless communication interfaces 340 can be implemented as firmware. The SAR manager 300 can control operation of the wireless communication interfaces 340 by controlling at least one of a resource usage, a transmission power (e.g., maximum transmission power limit (MTPL)) or a duty cycle of wireless transmission of data by the wireless communication interfaces 340. The SAR manager 300 can control the operation according to the determined particular control state, such as to lower the transmission power or the duty cycle to a particular value corresponding to the particular control state responsive to the particular control state corresponding with the device 200 being in an on-body state.

The SAR manager 300 can store or maintain one or more data structures representing a plurality of device component states 350. The device component states 350 can include a Bluetooth (BT) state 360, a mitigation level 365, and a power state 370. The SAR manager 300 can have a SAR state data structure 355, such as an array, lookup table, or database, indicating the plurality of control states, and the state detector 325 can identify the particular control state from the SAR states 355 and/or store the particular control state using the SAR states 355.

The BT state 360 can include states indicating a quality of the operation of Bluetooth on the device. BT state 360 can indicate whether Bluetooth is operating or not on the device 200. BT state 360 can indicate whether a parameter of operation of Bluetooth on the device 200 meets a threshold value. For example, BT state 360 can indicate whether the packet rate of the Bluetooth signal is below a threshold value.

The mitigation level 365 can indicate modifications to resource usage by the wireless communication interfaces 340 resulting from evaluation of factors in addition to SAR/PD, such as temperature of the device 200 that may indicate instructions to reduce resource usage (e.g., MTPL, duty cycle, antennas or antenna chains, radio channels, etc.) to reduce the temperature. The SAR manager 300 can determine how to control the wireless communication interfaces 340 according to the mitigation level 365 and the particular control state, including but not limited to determining a resource usage as a minimum of the resource usage indicated by the mitigation level 365 and the particular control state, an average or weighted average of the resource usage indicated by the mitigation level 365 and the particular control state, a maximum of the resource usage indicated by the mitigation level 365 and the particular control state, or various combinations thereof.

The power state 370 can indicate at least one of a remaining power available (e.g., remaining capacity) of the power supply 250 or the power mode in which the device 200 is operating. For example, the power state 370 can indicate whether the device 200 is in the normal power mode, the low power mode, or the deep sleep mode.

FIG. 4 is a flowchart depicting an example process 400 that can be implemented by the SAR manager 300 to detect SAR states (e.g., control states) according to sensor data from sensors 215. The SAR manager 300 can evaluate sensor data from the IMU sensor 320 to determine whether the device 200 is in a static (e.g., not moving) or non-static (e.g., moving) state; the static can indicate that the device 200 is off-body. For example, responsive to the sensor data indicating that velocity and/or acceleration are zero or less than a nominal threshold value over a duration (e.g., to account for noise), the SAR manager 300 can determine that the device 200 is in the static state. Responsive to determining that the device 200 is in the static state, the SAR manager 300 can initiate a timer (which can be used to confirm that the static state is not a transitory state). Responsive to the timer expiring, the SAR manager 300 can determine the particular control state to be a first state, which may indicate that the device 200 is off-body. Responsive to determining the particular control state to be the first state, the SAR manager 300 can determine to not modify the operation of the wireless communication interfaces 340 to account for SAR/PD considerations, having determined that the device 200 is off-body. Responsive to the timer not expiring (e.g., while evaluating the timer, or responsive to the sensor data from the IMU sensor 320 changing to indicate movement), the SAR manager 300 can maintain a previous value of the control state.

Responsive to the sensor data from the IMU sensor 320 indicating that the device 200 is not static (e.g., moving), the SAR manager 300 can evaluate sensor data indicating whether the device 200 is coupled with the charger 275 (e.g., in the charging case). Responsive to determining that the sensor data indicates that the device 200 is coupled with the charger 275, the SAR manager 300 can determine the particular control state to be a second state.

Responsive to determining that the device 200 is not coupled with the charger 275, the SAR manager 300 can evaluate sensor data from the Hall sensor 310 to determine whether the arm of the device 200 is folded (e.g., the hinge 312 is open or closed). Responsive to determining that the arm of the device 200 is folded, the SAR manager 300 can determine the particular control state to be a third state. The third state may be indicative of the device 200 being held or carried on the body of the user.

Responsive to determining that the arm of the device 200 is unfolded, the SAR manager 300 can evaluate sensor data from the Don/Doff sensor 315 to determine whether the device 200 is being worn (e.g., on the head/face). Responsive to determining that the device 200 is being worn, the SAR manager 300 can determine the particular control state to be a fourth state. Responsive to determining that the device 200 is not being worn, the SAR manager 300 can determine the particular control state to be a fifth state, which may correspond to relatively less mitigation than the fourth state.

It should be noted that the steps described above in conjunction with FIG. 4 can be modified. Some steps may be be omitted or others added. The example implementation described above is not meant to be exhaustive or exclusive. SAR determination 400 can be altered or use other inputs or criteria to make its determinations.

Table 1 provides an example of values for control states that the SAR manager 300 can maintain in a lookup table or other data structure to select the particular control state according to the sensor data from the sensors 215. For example, Table 1 can represent the relationships between sensor data state indications and control states as described with reference to FIG. 4 (certain indications are labeled parenthetically as they may be more plausible than others or may be the only plausible indication given the indications from other sensor data).

TABLE 1

| Control State | IMU Indication | Charging Case Indication | Hall Effect Indication | Don/Doff Indication |
|---|---|---|---|---|
| 1 | Static | Either | Either | Either |
| 2 | Non-Static | Yes | (Folded) | N/A |
| 3 | Non-Static | No | Folded | N/A |
| 4 | Non-Static | No | Unfolded | Don |
| 5 | Non-Static | No | Unfolded | Doff |

Figure 5:
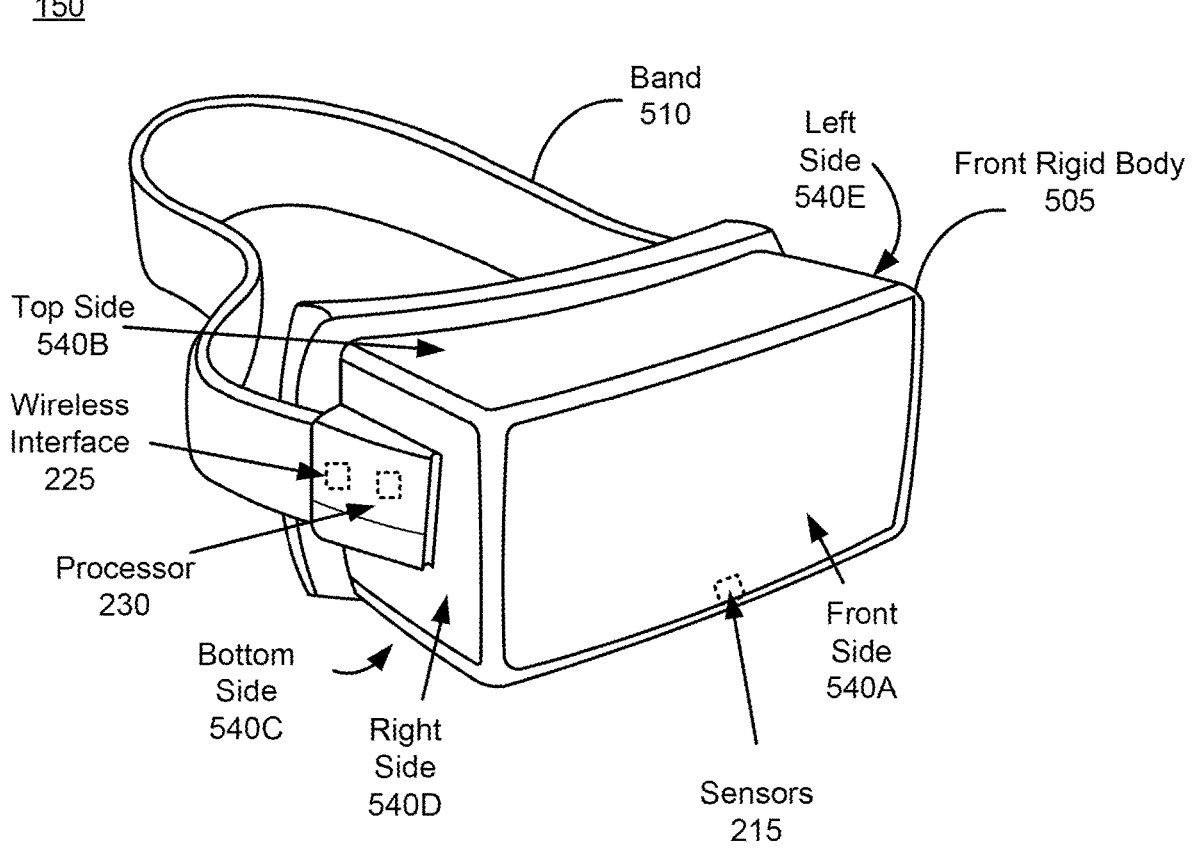
FIG. 5 is a diagram showing a perspective view of a head wearable display, according to an example implementation of the present disclosure.

FIG. 5 is a diagram of the HWD 150, in accordance with an example implementation. In some implementations, the HWD 150 includes a front rigid body 505 and a band 510.

The front rigid body 505 includes the display 245 (not shown in FIG. 5), lens (not shown in FIG. 5), the sensors 215, the wireless communication interface 225, and the processor 230. In the implementation shown by FIG. 5, the wireless communication interface 225, the processor 230, and the sensors 215 are located within the front rigid body 205, and may not be visible to the user. In other implementations, the HWD 150 has a different configuration than shown in FIG. 5. For example, the wireless communication interface 225, the processor 230, and/or the sensors 215 may be in different locations than shown in FIG. 5.

Figure 6A:
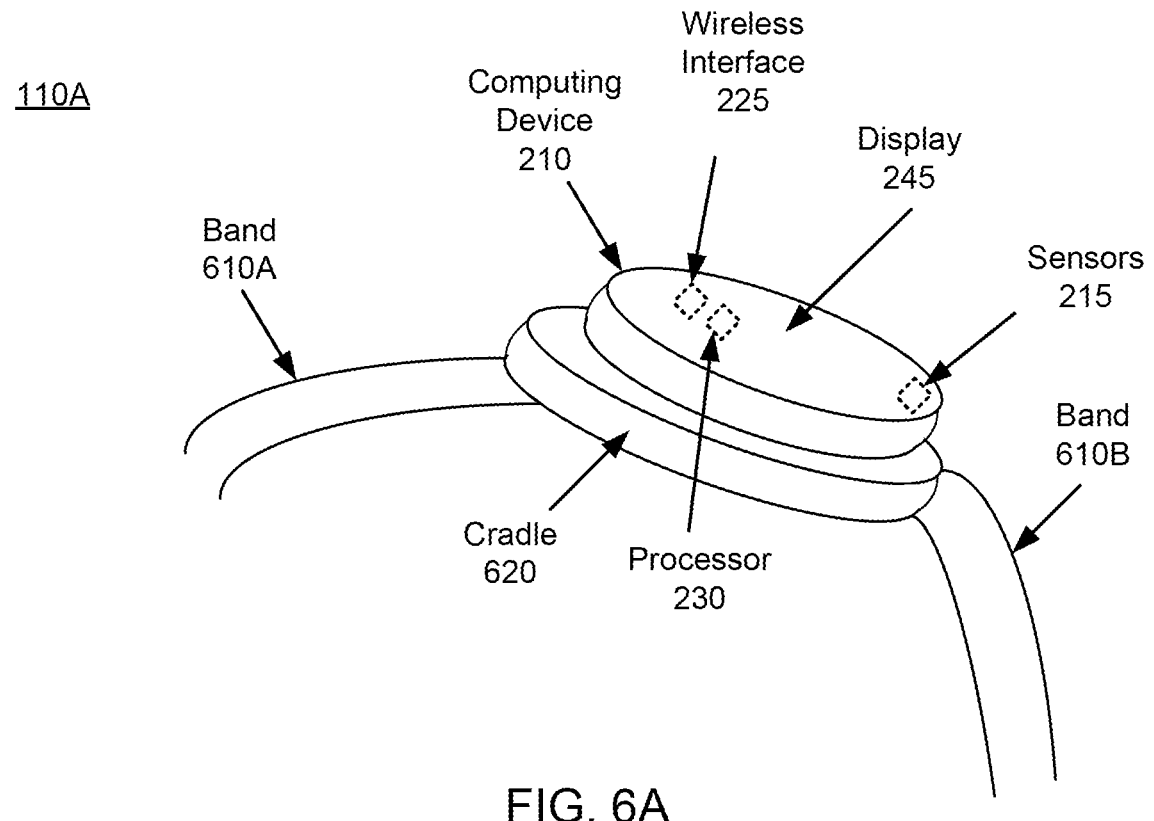
FIG. 6A is a diagram showing a perspective view of a wearable device including a computing device attached to a cradle, according to an example implementation of the present disclosure.
Figure 6B:
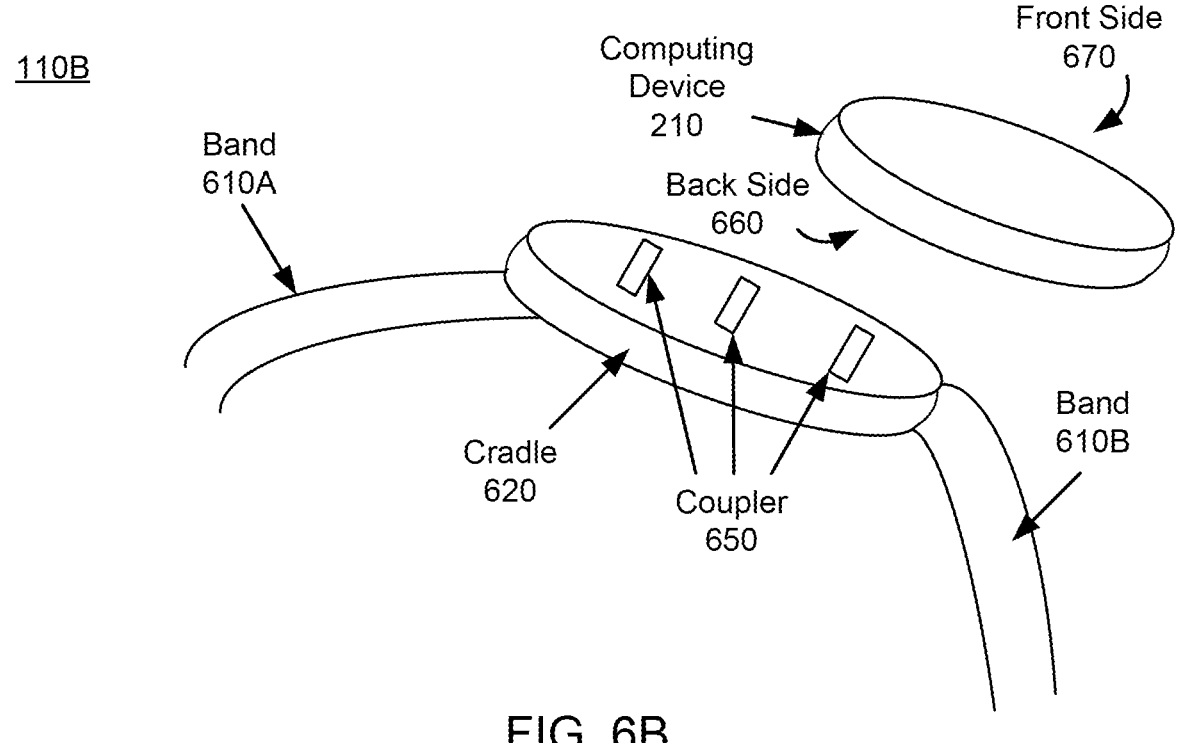
FIG. 6B is a diagram showing a perspective view of a wearable device including a computing device detached from a cradle, according to an example implementation of the present disclosure.

FIG. 6A is a diagram showing a perspective view of the wearable device 110A including a computing device 210 attached to a cradle 620, according to an example implementation of the present disclosure. The processor 230, the wireless communication interface 225 and the sensors 215 may be within a housing of the computing device 210, such that the processor 230, the wireless communication interface 225 and the sensors 215 may not be visible to the user. The computing device 210 may also include the display 245 on a front side 670 to present text or image. The computing device 210 may be detachable from the cradle 620 as shown in FIG. 4B. The computing device 210 may be detached from the cradle 620 to allow the user to charge the battery of the computing device 210, connect to another device through a cable, or capture an image, etc. The cradle 620 may be a wearable structure or a component to selectively hold or couple the computing device 210. The cradle 620 may include one or more couplers 650, to which a back side 460 of the computing device 210 can be attached. One or more couplers 650 may be mechanical latches, magnetics, hook and loop fasteners, or any components that allow the cradle 620 to selectively hold or couple the computing device 210. The cradle 620 may include or may be attached to wrist bands 610A, 620B.

Figure 7:
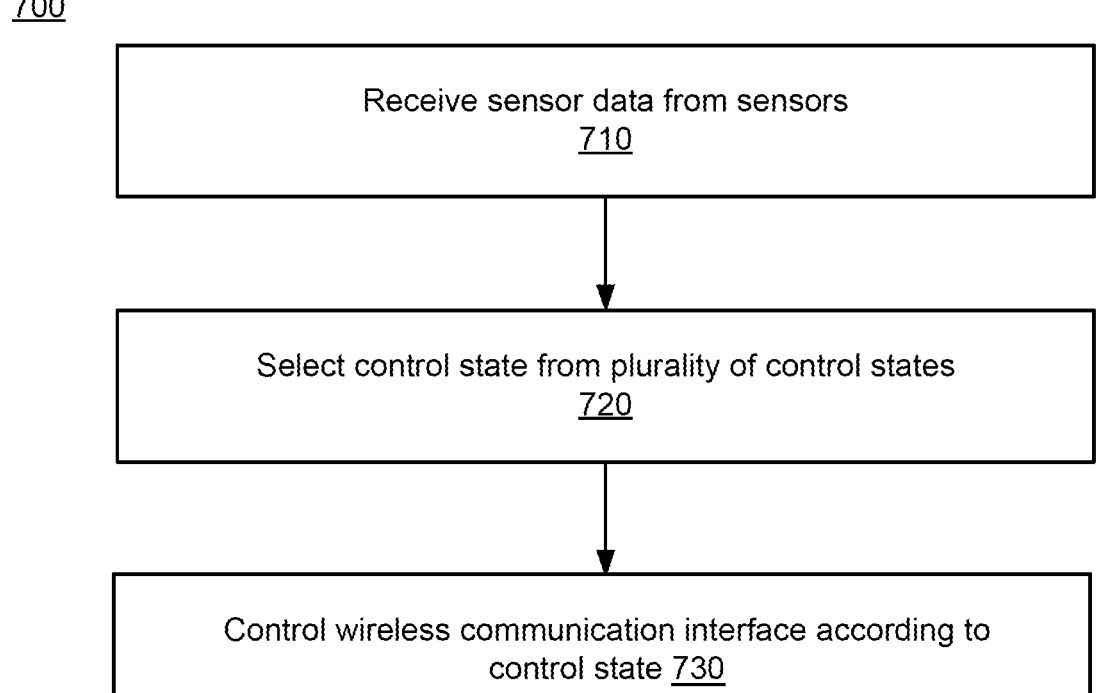
FIG. 7 is a flowchart showing a process of, according to an example implementation of the present disclosure.

FIG. 7 is a flowchart showing a method 700 of power aware dynamic SAR management, according to an example implementation of the present disclosure. In some implementations, the process 700 is performed by the wearable device 110, the wearable device 150, or the device 200. In some implementations, the method 700 is performed by other entities. In some implementations, the method 700 includes more, fewer, or different acts than shown in FIG. 7; for example, the method 700 can include one or more operations described with reference to FIG. 4. In brief overview, the method 700 can include receiving (710) sensor data from a plurality of sensors. The method 700 can include selecting (720) a particular control state from a plurality of control states according to the sensor data. The method 700 can include (730) controlling operation of at least one wireless communication interface according to the particular control state.

Referring to FIG. 7 in greater detail, sensor data can be received (710) from a plurality of sensors. The sensors can include, for example, a position sensor, such as an IMU, that indicates movement data (e.g., position, velocity, acceleration, whether movement is occurring). The sensors can include a Hall effect sensor to indicate whether an arm of the device (e.g., temple arm of smart glasses) is in a folded state or unfolded state. The sensors can include a Don/Doff sensor to indicate whether the device is being worn on the face and/or head of a user. The sensors can include a sensor to indicate whether the device is coupled with a charger, such as by being in a charging case. The sensor data can be requested and/or received synchronously or asynchronously from various combinations or the sensors. In some implementations, the device may be in a lower power, sleep, or deep sleep mode, and certain sensors may be less active (e.g., may detect and output sensor data less frequently or using less power) or disabled, in which the sensor data from particular sensors may not be received at particular instances.

A particular control state can be selected (720) from a plurality of control states according to the sensor data. The control states can correspond to various use cases or positions of the device, such as whether the device is off-body or on-body; or whether the device is being worn on the face or head, in a pocket, hanging from clothing, or in its charging case, among other possible use cases or positions. The particular control state can be determined by evaluating the sensor data. For example, the sensor data can be received as indicating specific states of respective aspects of the device, or the sensor data can be processed (e.g., by comparing with thresholds or applying as input to a function or model) to determine the states. The states can include, for example, whether the device is moving or not moving, as indicated by data from the IMU; whether the arm of the device is folded or not folded, as indicated by data from the Hall effect sensor; whether the device is coupled with the charger; and whether the device is being worn on the head/body of the user, as indicated by the Don/Doff sensor. The particular control state can be selected based on particular combinations of various such states (which may depend on which sensor data is available to evaluate).

The wireless communication interface can be controlled (730) according to the particular control state. For example, various resource usage parameters of the wireless communication interface, such as transmission power (e.g., MTPL), duty cycle, number of antennas or antenna/transmit/receive chains, number of channels, or various combinations thereof can be controlled according to the particular control state. In some implementations, controlling the wireless communication interface includes reducing the resource usage responsive to the particular control state being a control state indicative of the device being on-body. In some implementations, controlling the wireless communication interface includes not modifying the resource usage responsive to the particular control state being a control state indicative of the device being off-body. In some implementations, the plurality of control states can include multiple control states indicative of the device being on-body, and at least two of the multiple control states can indicate different levels of mitigation of resource usage. Controlling the wireless communication interface can include using data such as power levels (of a battery or other power supply), desired and/or actual performance of the device or an application of the device, as well as power or thermal mitigation levels determined according to the power levels and/or temperature data.

Figure 8:
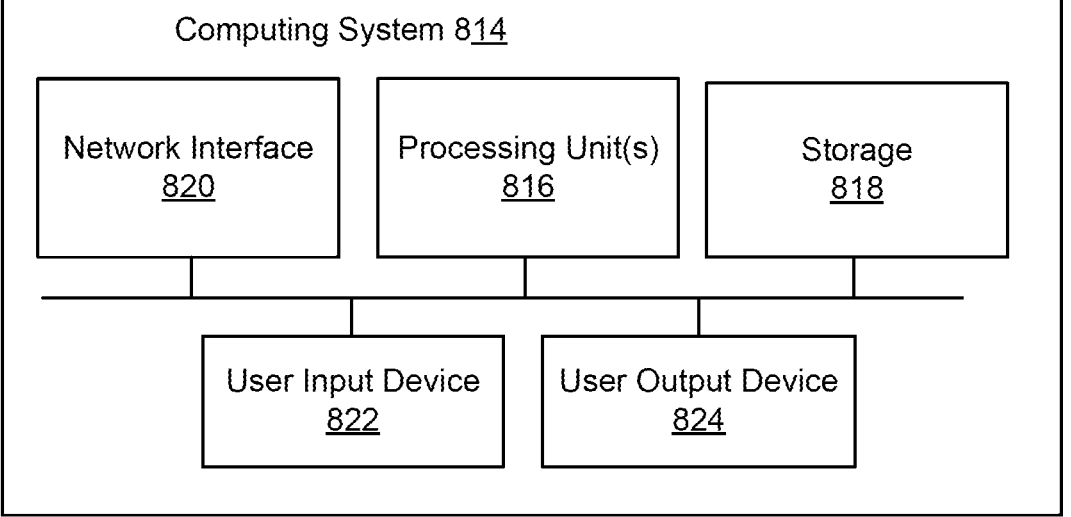
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some implementations, the wearable device 110, the wearable device 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 814 can be implemented to provide VR, AR, MR experience. In some implementations, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It will be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary implementation, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or implementation, and references to "an implementation," "some implementations," "one implementation" or the like are not necessarily mutually exclusive and are intended to indicate that a particular feature, structure, or characteristic described in connection with the implementation can be included in at least one implementation or implementation. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary implementations, and that such variations are intended to be encompassed by the present disclosure.

What is claimed is:

1. A head wearable device, comprising:

at least one wireless communication interface configured to wirelessly communicate with a remote device; and an inertial measurement unit (IMU) sensor configured to provide data used to determine whether the head wearable device is in motion;

a hinge positioned between an arm and a display of the head wearable device;

another sensor, distinct from the IMU sensor, coupled with or adjacent to the hinge, the other sensor configured to provide other data used to determine whether the hinge is in an open or closed state; and one or more processors configured to:

determine, based on data from the IMU sensor and the other sensor, that the head wearable device is in a first control state of a plurality of control states corresponding to the head wearable device not being worn, in accordance with determining that the head wearable device is in the first control state, causing the at least one wireless communication interface to operate with a first set of power management criteria, wherein the first set of power management criteria includes a first specific absorption rate (SAR) and a first power density (PD);

determine, based on data from the IMU sensor and the other sensor, that the head wearable device is in a second control state of the plurality of control states corresponding to the head wearable being worn;

in accordance with determining that the head wearable device is in the second control state, causing the at least one wireless communication interface to operate with a second set of power management criteria, wherein the second set of power management criteria includes a second SAR lower than the first SAR and a second PD lower than the first PD, respectively; and control operation of the at least one wireless communication interface according to the first and second control states.

2. The head wearable device of claim 1, wherein the other sensor is a Hall sensor configured to detect information used to determine whether the arm of the head wearable device that is coupled with a display member of the head wearable device is in a first position or a second position.

3. The head wearable device of claim 1, wherein the first control state is an on-body state and the second control state is an off-body state.

4. The head wearable device of claim 1, wherein the one or more processors are configured to control the operation of the at least one wireless communication interface by controlling at least one of a transmission power or a duty cycle of wireless data transmission by the at least one wireless communication interface based on a respective control state that head wearable device is in.

5. The head wearable device of claim 1, wherein at least one first sensor of the IMU sensor or the other sensor is disabled according to a power state of a power supply of the head wearable device, and the one or more processors are configured to determine a particular control state according to sensor data from a non-disabled sensor of the IMU sensor or the other sensor.

6. The head wearable device of claim 1, wherein the one or more processors are configured to reduce at least one of a transmission power or a duty cycle of transmission by the at least one wireless communication interface, responsive to the head wearable device being in the first control an on body state.

7. The head wearable device of claim 1, wherein sensor data from a different sensor distinct from the IMU sensor and the other sensor comprises an indication of whether the head wearable device is in a charging state.

8. A method comprising:

determining, by one or more processors of a head wearable device, based on (i) an inertial measurement unit (IMU) sensor configured to provide data used to determine whether the head wearable device is in motion, and (ii) another sensor, distinct from the IMU sensor, coupled with or adjacent to a hinge positioned between an arm and a display of the head wearable device, the other sensor configured to provide other data used to determine whether the hinge is in an open or closed state, that the head wearable device is in a first control state of a plurality of control states corresponding to the head wearable device not being worn;

in accordance with determining that the head wearable device is in the first control state, causing at least one wireless communication interface to operate with a first set of power management criteria, wherein the first set of power management criteria includes a first specific absorption rate (SAR) and a first power density (PD);

determine, based on data from the IMU sensor and the other sensor, that the head wearable device is in a second control state of the plurality of control states corresponding to the head wearable being worn;

in accordance with determining that the head wearable device is in the second control state, causing the at least one wireless communication interface to operate with a second set of power management criteria, wherein the second set of power management criteria includes a second SAR lower than the first SAR and a second PD lower than the first PD, respectively; and controlling, by the one or more processors, operation of the at least one wireless communication interface according to the first and second control state.

9. The method of claim 8, wherein the other sensor is a Hall sensor configured to detect information used to determine whether the arm of the head wearable device that is coupled with a display member of the head wearable device is in a first position or a second position.

10. The method of claim 8, wherein the first control state is an on-body state, and the second control state is an off-body state.

11. The method of claim 8, further comprising controlling, by the one or more processors, the operation of the at least one wireless communication interface by controlling at least one of a transmission power or a duty cycle of wireless data transmission by the at least one wireless communication interface based on a respective control state that head wearable device is in.

12. The method of claim 8, further comprising:

disabling, by the one or more processors, at least one of the IMU sensor or the other sensor according to a power state of a power supply of the head wearable device; and determining, by the one or more processors, a particular control state according to sensor data from a non-disabled sensor of the IMU sensor or the other sensor.

13. The method of claim 8, further comprising reducing, by the one or more processors, at least one of a transmission power or a duty cycle of transmission by the at least one wireless communication interface, responsive to the head wearable device being in the first control state.

14. The method of claim 8, wherein sensor data from a different sensor distinct from the IMU sensor and the other sensor comprises an indication of whether the head wearable device is in a charging state.

15. A non-transitory computer readable medium storing computer-executable instructions that when executed by one or more processors of a head wearable device, cause the one or more processors to:

determine, based on (i) an inertial measurement unit (IMU) sensor configured to provide data used to determine whether the head wearable device is in motion, and (ii) another sensor, distinct from the IMU sensor, coupled with or adjacent to a hinge positioned between an arm and a display of the head wearable device, the other sensor configured to provide other data used to determine whether the hinge is in an open or closed state, that the head wearable device is in a first control state of a plurality of control states corresponding to the head wearable device not being worn;

in accordance with determining that the head wearable device is in the first control state, causing at least one wireless communication interface to operate with a first set of power management criteria, wherein the first set of power management criteria includes a first specific absorption rate (SAR) and a first power density (PD);

determine, based on data from the IMU sensor and the other sensor, that the head wearable device is in a second control state of the plurality of control states corresponding to the head wearable being worn;

in accordance with determining that the head wearable device is in the second control state, causing the at least one wireless communication interface to operate with a second set of power management criteria, wherein the second set of power management criteria includes a second SAR lower than the first SAR and a second PD lower than the first PD, respectively; and control operation of the at least one wireless communication interface according to the first and second control state.

16. The non-transitory computer readable medium of claim 15, further comprising instructions to cause the one or more processors to control the operation of the at least one wireless communication interface by controlling at least one of a transmission power or a duty cycle of wireless data transmission by the at least one wireless communication interface based on a respective control state that head wearable device is in.

17. The non-transitory computer readable medium of claim 15, further comprising instructions to cause the one or more processors to reduce at least one of a transmission power or a duty cycle of transmission by the at least one wireless communication interface, responsive to the head wearable device being in the first control state.

18. The non-transitory computer readable medium of claim 15, wherein the other sensor is a Hall sensor configured to detect information used to determine whether the arm of the head wearable device that is coupled with a display member of the head wearable device is in a first position or a second position.

19. The non-transitory computer readable medium of claim 15, wherein the first control state is an on-body state and the second control state is an off-body state.

20. The non-transitory computer readable medium of claim 15, at least one first sensor of the IMU sensor or the other sensor is disabled according to a power state of a power supply of the head wearable device, and the one or more processors are configured to determine a particular control state according to sensor data from a non-disabled sensor of the IMU sensor or the other sensor.

* * * * *